United States Patent
Okoshi et al.

(10) Patent No.: US 9,379,487 B2
(45) Date of Patent: Jun. 28, 2016

(54) CARD CONNECTOR

(71) Applicant: Tyco Electronics Japan G.K., Kanagawa (JP)

(72) Inventors: Yutaka Okoshi, Kanagawa (JP); Junya Tsuji, Kanagawa (JP)

(73) Assignee: Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 14/483,477

(22) Filed: Sep. 11, 2014

(65) Prior Publication Data

US 2015/0072549 A1 Mar. 12, 2015

(30) Foreign Application Priority Data

Sep. 12, 2013 (JP) .................................. 2013005322

(51) Int. Cl.
  *H01R 13/62* (2006.01)
  *H01R 13/629* (2006.01)
  *H01R 13/633* (2006.01)
  *G06K 13/08* (2006.01)

(52) U.S. Cl.
  CPC ...... *H01R 13/62988* (2013.01); *G06K 13/0831* (2013.01); *H01R 13/633* (2013.01)

(58) Field of Classification Search
  CPC ............... H01R 13/633; H01R 13/635; H01R 13/6335; H01R 13/62933; H01R 13/62988; H05K 5/0269; H05K 7/1409; G06K 13/0806; G06K 13/0831

USPC .................. 439/160, 156, 325, 630, 946, 159
See application file for complete search history.

(56) References Cited

U.S. PATENT DOCUMENTS

| | | | | |
|---|---|---|---|---|
| 6,083,018 A | * | 7/2000 | Hara et al. | 439/159 |
| 6,319,029 B2 | * | 11/2001 | Nishioka | 439/159 |
| 6,626,689 B1 | * | 9/2003 | Yu | 439/159 |
| 7,150,403 B2 | | 12/2006 | Nakajima | |
| 7,309,245 B2 | | 12/2007 | Sadatoku | |

FOREIGN PATENT DOCUMENTS

| | | | |
|---|---|---|---|
| JP | 6151004 A | 5/1994 | |
| JP | 1148869 A | 2/1999 | |
| JP | 2005203231 A | 7/2005 | |
| JP | 2000223211 A | 8/2011 | |
| JP | 2011171141 A | 9/2011 | |
| JP | 2011171142 A | 9/2011 | |

\* cited by examiner

*Primary Examiner* — Neil Abrams
*Assistant Examiner* — Travis Chambers
(74) *Attorney, Agent, or Firm* — Barley Snyder

(57) ABSTRACT

A card connector is disclosed having a housing. An eject lever extends transversely to a card inserting direction, and has a first end, a second end, and a central portion pivotally mounted to the housing to pivot when a card is inserted into the card connector or ejected therefrom. A slider extends along the inserting direction and is in contact with the first end of the eject lever. The slider is pushed in the ejection direction by the eject lever when a card is inserted and pushes the first end of the eject lever in the inserting direction to pivot the second end of the eject lever in the ejecting direction to eject the card. A friction member is in direct contact with the eject lever throughout the pivotable range of the eject lever.

19 Claims, 5 Drawing Sheets

CARD CONNECTOR

CROSS-REFERENCE TO RELATED APPLICATION

This application claims the benefit of the filing date under 35 U.S.C. §119(a)-(d) to Japanese Patent Application No. 2013-005322, dated Sep. 12, 2013.

FIELD OF THE INVENTION

The present invention generally relates to a card connector, and more specifically a card connector into which a card, such as a memory card or a Subscriber Identity Module (SIM) card, is inserted.

BACKGROUND

JP 06-151004 A discloses an ejector unit for ejecting a card, the ejector unit being provided with a cam bar pivotally mounted on a frame and an operation rod driving the cam bar. When a card inserted, the card itself determines the position of the cam bar and the operation rod by applying direct pressure thereto. Consequently, the inserted card prevents the cam bar and operation rod from rattling due to vibration. However, when there is no card inserted, the cam bar and the operation rod are subjected to vibrational movement. In particular, the cam bar is easily moved by the vibrations, which may cause rattling.

JP 2002-269513 A discloses a shutter mechanism for a card module, wherein an inserted card applies pressure against a shutter body. Similarly, when a card is inserted, the pressure of the card against the shutter mechanism prevents rattling of the shutter mechanism. However, when there is no card inserted, vibrations may cause the shutter mechanism to rattle.

In light of the above circumstances, there is a need for a card connector that does not rattle in the absence of an inserted card.

SUMMARY

A card connector has a housing, an eject lever, a slider and a friction member. The eject lever extends transversely to a card inserting direction, and has a first end, a second end, and a central portion pivotally mounted to the housing to pivot when a card is inserted into the card connector or ejected therefrom. The slider extends along the inserting direction and is in contact with the first end of the eject lever. The slider is pushed in the ejection direction by the eject lever when a card is inserted and pushes the first end of the eject lever in the inserting direction to pivot the second end of the eject lever in the ejecting direction to eject the card. The friction member is in direct contact with the eject lever throughout the pivotable range of the eject lever.

BRIEF DESCRIPTION OF THE DRAWINGS

The invention will now be described by way of example, with reference to the following Figures, of which.

DETAILED DESCRIPTION

Figure 1:
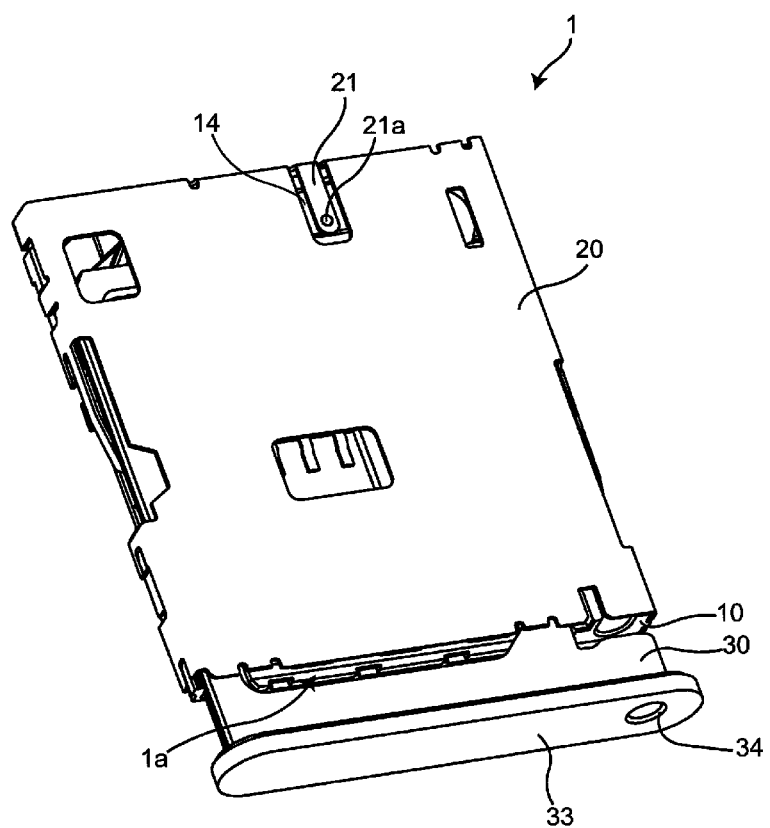
FIG. 1 is an external perspective view of a card connector.

A card connector 1 is provided with a housing 10, a shell 20, and a tray 30. The tray 30 has a large opening 31 formed in the center, and a support base 32 supporting a memory card positioned on the edge of the opening 31. A SIM card (not shown) is supported on this tray 30 such that a peripheral edge of a bottom base of the SIM card rests on the support base 32 and a central area of the card bottom face faces downward through the opening 31. The card connector 1 may also include a slider 13 and an eject lever 14.

An insertion opening 1a through which the tray 30 is inserted is formed between the housing 10 and the shell 20. In addition, a receiving space receiving the SIM card rested on the tray 30 is formed behind the insertion opening 1a. The tray 30 is slidable in a direction of insertion (direction of arrow A shown in FIG. 2) into the housing 10 and in a direction of ejection (direction of arrow B shown in FIG. 3).

Figure 2:
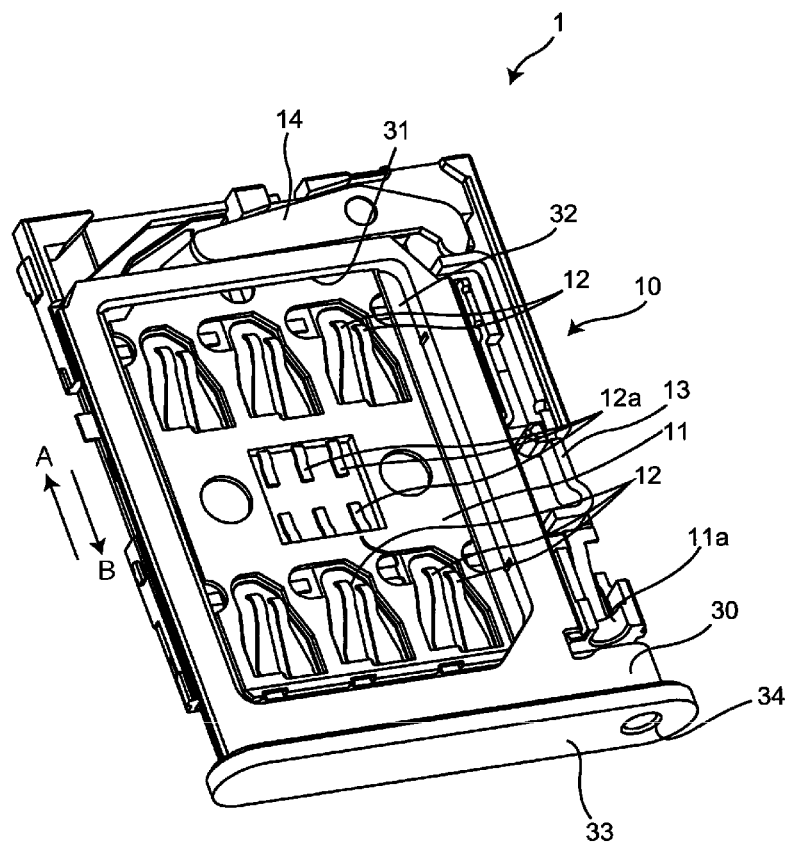
FIG. 2 is an external perspective view of the card connector, the exterior of which is shown in FIG. 1, with a shell removed.

It should be noted that the inserting direction (direction of arrow A) and the ejecting direction (direction of arrow B) herein are collectively referred to as "inserting/ejecting direction". The tray 30, with the SIM card rested thereon, is inserted in the inserting direction (direction of arrow A) through the insertion opening 1a, and is received in the receiving space formed between the housing 10 and the shell 20. FIGS. 1 and 2 show the tray 30 positioned in the receiving space. The position of the SIM card on the tray 30 while in the receiving space is referred to as "inserted position". See FIGS. 1 and 2. An outer wall 33 of the tray 30 forms a portion of a housing for a device on which the card connector 1 is mounted. FIGS. 1 and 2 also show the tray 30 positioned in the receiving space, with the outer wall 33 and the insertion opening 1a spaced at a distance apart. This spacing is created because the mount position of the card connector 1 in the device is set back from a surface of the case of the device.

As shown in FIG. 2, the housing 10 includes a plastic body 11 and a plurality of metal contacts 12 molded integrally with the body 11. Each contact 12 has a board connecting portion 12a to be soldered to a surface of a circuit board (not shown). Conductive pads on a lower face of the SIM card rest on the tray 30. (not shown) These contacts 12 come into contact with the pads on the lower face of the card to electrically interconnect the SIM card and the circuit board.

Figure 3:
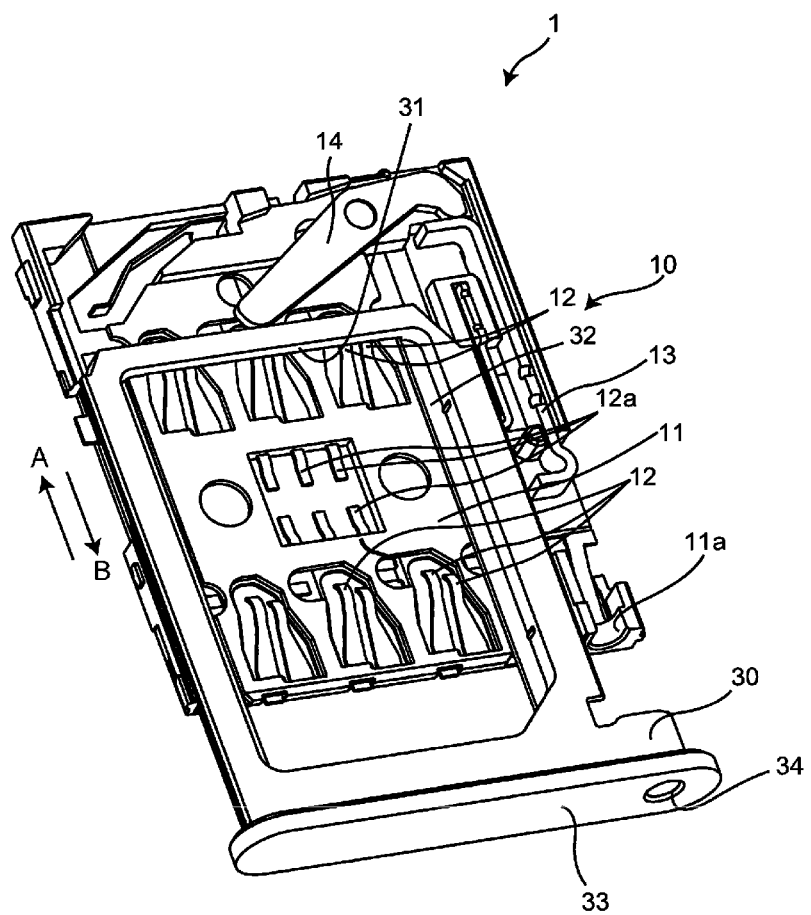
FIG. 3 is a perspective view of the card connector with the shell detached.

FIG. 3 shows the card connector 1 with the shell removed and the tray 30 ejected from the receiving space. The position of the SIM card (not shown) on the ejected tray 30 is referred to as an "ejected position".

The slider 13 extends in the inserting/ejecting directions (direction of arrows A-B), and is slidable on the body 11 in the inserting/ejecting directions (direction of arrow A-B), between the position shown in FIG. 2 and the position shown in FIG. 3. The slider 13 moves from the position shown in FIG. 2 to the position shown in FIG. 3 in the inserting direction (direction of arrow A) through a pushing operation using an external pin (not shown).

A pin receiving hole 34 into which the pin is inserted is formed in the tray 30, and an opening 11a receiving the pin is also formed in the body 11.

The eject lever 14 extends transversely in the inserting/ejecting direction (direction of arrow A-B), and is pivotally mounted at a central portion on the body 11. One end of the eject lever 14 is positioned so as to interfere with the inserted tray 30, while the other end is positioned so as to interfere with the slider 13. When the tray 30 is inserted, the eject lever 14 is pushed by the tray 30 and pivoted clockwise, thereby sliding the slider 13 to the position shown in FIG. 2 in the ejecting direction (direction of arrow B). Once the pin is inserted through the pin receiving hole 34 of the tray 30 and pushes the slider 13, the eject lever 14 is pushed by the slider 13 and pivoted counterclockwise, thereby ejecting the tray 30. The outer wall 33 of the tray 30 which is at the position shown in FIG. 3, projects from the device on which the card connector 1 is mounted. The tray 30 can be pulled out of the card connector 1 by a user through pinching the outer wall 33.

In the shell 20 shown in FIG. 1, a spring member 21 is formed at a position facing the eject lever 14 disposed in the housing 10. In an embodiment, the spring member 21 is a friction providing element. In an exemplary embodiment, the shell 20 is made of metal.

Figure 4:
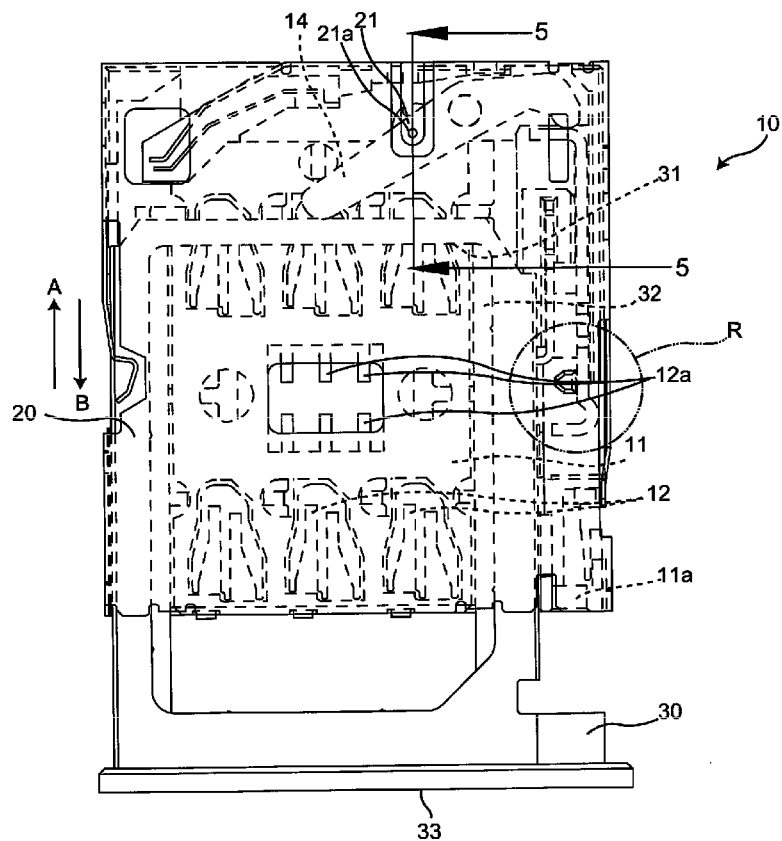
FIG. 4 is a plan view of the card connector.
Figure 5:
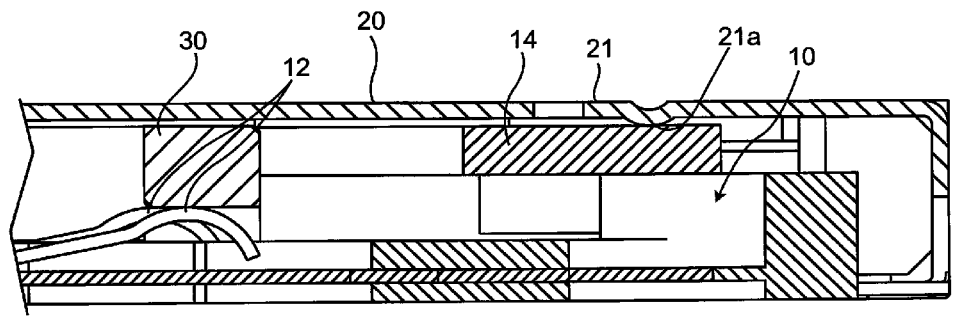
FIG. 5 is a partially sectional view taken along line 5-5 in FIG. 4.

In FIG. 4, an upper face of the housing 10 covered with the shell 20 is drawn in broken line. A dimple 21a is positioned on the spring member 21 and projects towards and contacts the eject lever 14. The dimple 21a is always in contact with the eject lever 14 regardless of the pivoted posture of the eject lever 14 and therefore creates friction against the movement of the eject lever. In both the inserted position (FIG. 1) of the tray 30 and in the ejected position (FIG. 4) of the tray 30, the dimple 21a creates friction against the eject lever 14.

The friction generated by the dimple 21a is set to a level in which the primary movement of the eject lever 14 is not blocked when either pivoting clockwise when the eject lever 14 is pushed by the tray 30, or counterclockwise when the eject lever 14 is pushed by the slider 13.

The amount of applied friction is set to a level in which the eject lever 14 does not easily move, even if this card connector 1 is subjected to vibrations with the tray 30 drawn out. A major cause of rattling in card connectors is the movement of the eject lever 14 due to vibrations which the card connector 1 is subjected to with the tray 30 drawn out. In the case of the card connector 1 in an embodiment of the invention, since the eject lever 14 does not easily move even if the card connect 1 is subjected to vibrations with the tray 30 drawn out, the generation of rattling is suppressed.

In an embodiment, since the friction against the eject lever 14 is created by the spring member 21 of the shell 20, a constant level of pressing force can be applied to the eject lever 14 without being affected by part tolerances. In addition, the dimple 21a is provided on the spring member 21, and the dimple 21a is always pushing against the eject lever 14 during an entire range of pivoting by the eject lever 14. Therefore, even if the position of the eject lever 14 changes instantaneously due to application of an especially strong vibration, the eject lever 14 is still subjected to the pressing force of the dimple 21a, and rattling is still suppressed.

Figure 6:
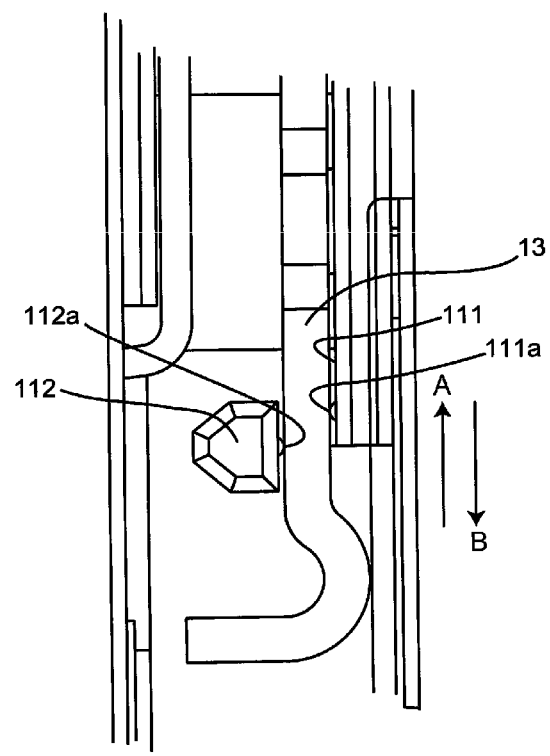
FIG. 6 is an enlarged view of a portion in a circle R shown in FIG. 4.

An exemplary embodiment of the slider 13 is shown in FIG. 6. The slider 13 slides in the inserting/ejecting directions (arrow A-B) along a guide wall 111 of the body 11. A post 112 is also positioned in the body 11. The guide wall 111 and the post 112 slidably hold the slider 13 from both sides transverse to the inserting/ejecting direction (direction of arrow A-B). A projection 111a extending vertically (upward and downward) is formed on the guide wall 111 so as to project towards the slider 13. Similarly, a projection 112a extending vertically is also formed on the post 112 so as to project towards the slider 13. These projections 111a, 112a hold the slider 13 therebetween with appropriate pressing force.

Therefore the slider 13 does not easily move, even if the card connector 1 is subjected to strong vibrations, thus preventing any rattling. However, the slider 13 can still slide smoothly in the inserting/ejecting directions (direction of arrow A-B) when the tray 30 is inserted. Further, the slider 13 can still be pushed by the eject lever 14 as the eject lever 14 is displaced the tray 30, and when the slider 13 is pushed in by the external pin. (not shown)

The embodiments described herein are for a card connector 1 of a type which has a tray for a SIM card to rest on and into/from which the tray 30 with the SIM card rested on is inserted/ejected. However, the card connector of the present invention is also applicable to a card connector of a type which is not provided with a tray and into/from which a card is directly inserted and ejected. In application using the latter type of card connector, the eject lever 14 directly interferes with the card such that the eject lever 14 is pushed by the inserted card, while the eject lever 14 pushes the card when the slider 13 is pushed in.

It should be noted that, in this embodiment, the dimple 21a is shown as an example of a projecting portion, but the projecting portion is not limited to the dimple 21a having a semispherical shape, but may be a ridge or bead extending substantially in the inserting/ejecting directions (direction of arrow A-B).

What is claimed is:

1. A card connector comprising:
   a housing;
   an eject lever extending transversely to a card inserting direction, and having a first end, a second end, and a central portion pivotally mounted to the housing to pivot when a card is inserted into the card connector or ejected therefrom;
   a slider extending along the inserting direction and in contact with the first end of the eject lever, the slider being pushed in an ejecting direction by the eject lever when a card is inserted and pushing the first end of the eject lever in the inserting direction to pivot the second end of the eject lever in the ejecting direction to eject the card;
   a friction member in direct contact with the eject lever throughout the pivotable range of the eject lever; and
   a shell that forms a card receiving space in combination with the housing.

2. The card connector according to claim 1, wherein the shell has a spring member in contact with the eject lever.

3. The card connector according to claim 2, wherein the spring member has a dimple projecting toward the eject lever.

4. The card connector according to claim 3, wherein the dimple is in direct contact with the eject lever.

5. The card connector according to claim 1, wherein the housing has a holding portion slidably holding the slider transversely to the inserting direction.

6. The card connector according to claim 5, wherein the slider is held by the holding portion exerting frictional force against any movement of the slider.

7. The card connector according to claim 1, further comprising a tray positioned in the card connector and slidable along the inserting direction.

8. The card connector according to claim 7, wherein the second end of the eject lever contacts the tray when the tray is inserted in the card connector.

9. The card connector according to claim 7, wherein the tray includes a pin receiving hole.

10. The card connector according to claim 9, wherein the body includes a pin receiving opening corresponding to the pin receiving hole.

11. The card connector according to claim 10, wherein a pin, inserted through the pin receiving hole and pin receiving opening and in contact with the slider, displaces the slider such that the slider urges the first end of the eject lever, pivoting the eject lever to urge the second end of the eject lever into contact with the inserted tray, displacing the inserted tray along the ejecting direction.

12. The card connector according to claim 1, wherein the housing includes a guide wall and a post positioned on opposite sides of the slider, transverse to the inserting direction.

13. The card connector according to claim 12, wherein the guide wall has a guide wall projection extending towards the slider.

14. The card connector according to claim 13, wherein the post has a post projection extending towards the slider.

15. The card connector according to claim 14, wherein the guide wall projection contacts the slider on a first side, and the post projection contacts the slider on a second side, opposite the first side.

16. The card connector according to claim 15, wherein the guide wall projection and the post projection apply opposing forces to the slider to position the slider therebetween.

17. A card connector comprising:
a housing;
an eject lever extending transversely to a card inserting direction, and having a first end, a second end, and a central portion pivotally mounted to the housing to pivot when a card is inserted into the card connector or ejected therefrom;
a slider extending along the inserting direction and in contact with the first end of the eject lever, the slider being pushed in an ejecting direction by the eject lever when a card is inserted and pushing the first end of the eject lever in the inserting direction to pivot the second end of the eject lever in the ejecting direction to eject the card;
a friction member in direct contact with the eject lever throughout the pivotable range of the eject lever; and
a tray positioned in the card connector and slidable along the inserting direction, the tray having a pin receiving hole;
wherein the second end of the eject lever contacts the tray when the tray is inserted in the card connector.

18. The card connector according to claim 17, wherein the body includes a pin receiving opening corresponding to the pin receiving hole.

19. The card connector according to claim 18, wherein a pin, inserted through the pin receiving hole and pin receiving opening and in contact with the slider, displaces the slider such that the slider urges the first end of the eject lever, pivoting the eject lever to urge the second end of the eject lever into contact with the inserted tray, displacing the inserted tray along the ejecting direction.

* * * * *